United States Patent
Zandifar et al.

(10) Patent No.: US 7,554,575 B2
(45) Date of Patent: Jun. 30, 2009

(54) FAST IMAGING SYSTEM CALIBRATION

(75) Inventors: Ali Zandifar, Cupertino, CA (US); Anoop K. Bhattacharjya, Campbell, CA (US)

(73) Assignee: Seiko Epson Corporation, Tokyo (JP)

( * ) Notice: Subject to any disclaimer, the term of this patent is extended or adjusted under 35 U.S.C. 154(b) by 587 days.

(21) Appl. No.: 11/260,964

(22) Filed: Oct. 28, 2005

(65) Prior Publication Data
US 2007/0106482 A1 May 10, 2007

(51) Int. Cl.
*H04N 5/225* (2006.01)
*H04N 17/00* (2006.01)

(52) U.S. Cl. .................................. 348/207.99; 348/187

(58) Field of Classification Search ................. 348/180, 348/182, 187, 188, E13.016, 189, 42, 43, 348/47, 48, 49, 50, 52, 207.99; 382/294, 382/154; 702/85, 116
See application file for complete search history.

(56) References Cited

U.S. PATENT DOCUMENTS

| | | | | |
|---|---|---|---|---|
| 4,414,573 A * | 11/1983 | Griesshaber et al. | ........ | 348/188 |
| 5,091,773 A * | 2/1992 | Fouche et al. | ............... | 348/806 |
| 5,406,375 A * | 4/1995 | Brandstetter | ................ | 356/124 |
| 5,657,079 A | 8/1997 | Thario et al. | | |
| 5,821,993 A | 10/1998 | Robinson | | |
| 5,918,192 A * | 6/1999 | Tomaszewski | ............... | 702/85 |
| 6,115,492 A * | 9/2000 | Meltzer et al. | .............. | 382/162 |
| 6,256,062 B1 * | 7/2001 | Endo | ........................ | 348/223.1 |
| 6,462,777 B1 * | 10/2002 | Hamaguri | ................... | 348/188 |
| 6,542,185 B1 * | 4/2003 | Bogardus | ................. | 348/223.1 |
| 6,654,493 B1 * | 11/2003 | Hilliard et al. | .............. | 382/167 |
| 6,724,423 B1 * | 4/2004 | Sudo | .......................... | 348/188 |
| 6,798,446 B2 * | 9/2004 | Maggi | ................... | 348/207.99 |
| 6,975,391 B1 * | 12/2005 | Asano et al. | ............. | 356/237.1 |
| 6,985,175 B2 * | 1/2006 | Iwai et al. | .................... | 348/187 |
| 7,015,951 B1 * | 3/2006 | Yoshigahara et al. | ... | 348/207.99 |
| 7,020,331 B2 * | 3/2006 | Saikawa et al. | ............. | 382/167 |
| 7,023,472 B1 * | 4/2006 | Kang et al. | ................. | 348/187 |
| 7,023,473 B2 * | 4/2006 | Iwai et al. | ................... | 348/187 |
| 7,307,654 B2 * | 12/2007 | Chang | ..................... | 348/218.1 |
| 2004/0189805 A1 * | 9/2004 | Seitz | .......................... | 348/188 |

OTHER PUBLICATIONS

"The Development of Camera Calibration Methods and Models", Clarke, T.A. & Fryer, J.F. 1998, (pp. 51-66).

"A Four-step Camera Calibration Procedure with Implicit Image Correction", Janne Heikkila and Olli Silven, Infotech Oulu and Department of Electrical Engineering, University of Oulu.

(Continued)

*Primary Examiner*—Lin Ye
*Assistant Examiner*—Marly Camargo (57) ABSTRACT

Systems and methods are disclosed for calibrating an imaging system comprising a processing unit communicatively coupled to one or more imaging devices. The imaging system may also include a display. In an embodiment, a sequence of display features are displayed on a display, and imaged by the imaging device or devices. Spatial data is compiled related to the display features and the corresponding image features. In an embodiment, the display, imaging device or devices, or both may be repositioned and another sequence of display features may be presented and the spatial data compiled. Using optimization and calibration techniques, the compiled spatial data may be used to obtain one or more internal imaging device parameters, one or more external parameters, or both.

20 Claims, 7 Drawing Sheets

OTHER PUBLICATIONS

"Robust 3-D Motion Estimation and Dept Layering", N. Komodakis and G. Tziritas, Institute of Computer Science—Forth, and Department of Computer Science, University of Crete.

"Detection and Location of Moving Objects Using Deterministic Relaxation Algorithms", N. Paragios and G. Tziritas, Institute of Computer Science—Forth, and Department of Computer Science, University of Crete, pp. 201-205. *IEEE*, 1996.

"On Plane-Based Camera Calibration: A General Algorithm, Singularities, Applications", Peter F. Sturm and Stephen J. Maybank, Computational Vision Group, Department of Computer Science, The University of Reading Whiteknights, UK, *IEEE*, 1999.

"A Versatile Camera Calibration Technique for High-Accuracy 3D Machine Vision Metrology Using Off-the-Shelf TV Cameras and Lenses", Roger Y. Tsai, *IEEE* Journal of Robotics and Automation, vol. RA-3, No. 4, Aug. 1987, pp. 323-344.

"Flexible Camera Calibration By Viewing a Plane From Unknown Orientations", Zhengyou Zhang, Microsoft Research, *IEEE*, 1999.

* cited by examiner

FAST IMAGING SYSTEM CALIBRATION

BACKGROUND

1. Field of the Invention

The present invention relates generally to the field of imaging, and more particularly to systems and methods for calibrating an imaging system that includes one or more imaging devices.

2. Background of the Invention

Camera calibration is an integral part of imaging systems, such as computer vision systems, that operate on geometric models of acquired imagery. Current calibration methods generally require complex methods involving the use of carefully designed calibration target, e.g., checkerboard targets. Besides requiring specialized equipment, such as the calibration targets, these conventional methods also require considerable user effort and expertise for target preparation, maintenance, and subsequent calibration. A user is typically required to be aware of a number of issues, including alignment issues, lighting to enable segmentation techniques to reliably extract all of the features from the target, and issues related to errors from false or missed correspondences.

The complexity involved in current calibration methods make configuring imaging systems difficult, time-consuming, and expensive. These problems make it difficult for lay users to calibrate vision systems. These problems also make it is difficult to calibrate an imaging system quickly and effectively.

Accordingly, systems and methods are needed that provide simple, robust, and fast imaging system calibration.

SUMMARY OF THE INVENTION

According to an aspect of the present invention, systems and methods are disclosed for simple and fast calibration of an imaging system. Unlike traditional camera calibration routines, methods of the present invention may be used by untrained users.

In an embodiment, an imaging system includes one or more imaging devices and a processing unit. In an alternative embodiment, imaging system may also include a display.

According to an aspect of the present invention, a sequence of target patterns, or display features, optimized for different calibration and testing operations are displayed on a display, and imaged by an imaging device or devices. In an embodiment, a display feature may be displayed according to a temporal pattern or sequence that facilitates identification of the feature in the image plane of the imaging device. Spatial data is compiled related to the display features and the corresponding image features. In an embodiment, the display, imaging device or devices, or both may be repositioned and another sequence of display features may be presented and the spatial data compiled. Using known optimization and calibration techniques, the compiled spatial data may be used to obtain one or more internal imaging device parameters, one or more external parameters, or both.

According to another aspect of the present invention, the imaging system may be configured with a depth parameter. The depth parameter may be used to limit the transmission or recording of a captured image to only those portions of the captured image that are within a specified depth range or layer.

Although the features and advantages of the invention are generally described in this summary section and the following detailed description section in the context of embodiments, it shall be understood that the scope of the invention should not be limited to these particular embodiments. Many additional features and advantages will be apparent to one of ordinary skill in the art in view of the drawings, specification, and claims hereof.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE INVENTION

In the following description, for purposes of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. Furthermore, the appearance of the phrase "in one embodiment," "in an embodiment," or the like in various places in the specification are not necessarily all referring to the same embodiment.

Figure 1:
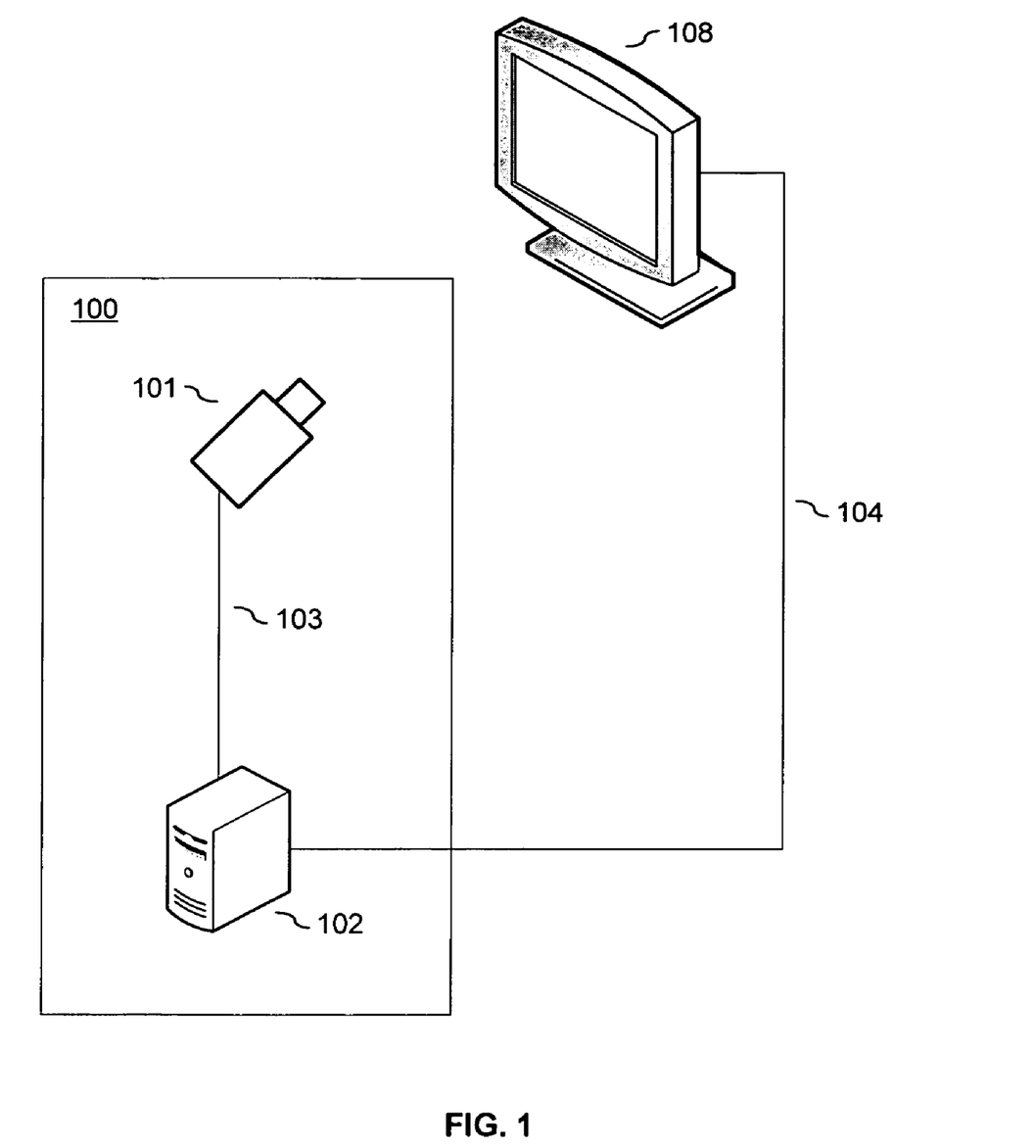
FIG. 1 depicts an embodiment of an imaging system, comprising an imaging device and a processing unit, and a display.

FIG. 1 depicts an embodiment of an imaging system 100 comprising an imaging device 101 communicatively coupled via connector 103 to a processing unit 102. Also depicted is display 108 coupled to processing unit 102 via connector 104. The terms "coupled" and "communicatively coupled" shall be understood to include direct connections and indirect connections through one or more intermediary devices.

In an embodiment, imaging device 101 may be a digital or analog camera. In an alternative embodiment, image device may be part of another device, including, without limitation, personal digital assistance (PDA), web camera, video camera, computer, multimedia device, mobile communication device, and the like.

In an embodiment, display 108 may be a flat-panel display, LCD screen, CRT monitor, touch screen, projector screen, or the like. Preferably, display 108 possesses a substantially flat display surface thereby reducing distortion during the compiling of spatial data, which will be explained in more detail below. In an embodiment, correction for display curvature, such as for a CRT monitor, may be performed using techniques known to those skilled in the art. However, in an embodiment, no correction for display curvature may be performed regardless of the display type.

Figure 2:
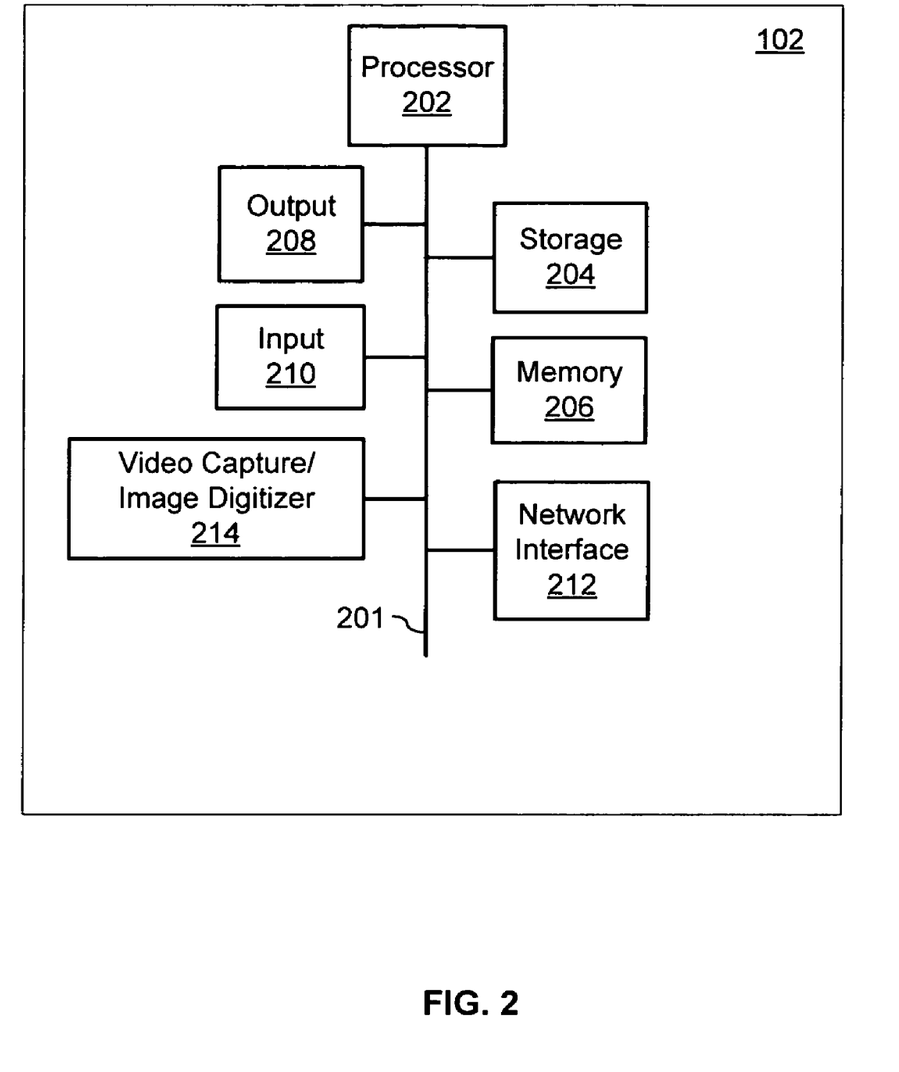
FIG. 2 depicts a functional block diagram of an embodiment of a processing unit.

FIG. 2 is a functional block diagram of an embodiment of processing unit 102. Illustrated are at least one processor 202 coupled to a bus 201. Also coupled to bus 201 is memory 206. In an alternative embodiment, processor unit 102 may include a storage device 204, one or more output devices 208, and one or more input devices 210 coupled to bus 201.

Processor 202 may be a general purpose processor such as an AMD processor, an INTEL x86 processor, a SUN MICROSYSTEMS SPARC, or a POWERPC compatible-CPU, or the processor may be an application specific processor or processors. Memory 206 may be, for example, firmware, read only memory (ROM), flash memory, non-volatile random access memory (NVRAM), random access memory (RAM), or any combination thereof and holds instructions and data used by processor 202.

Storage device 204 may be a hard disk drive and/or another device capable of storing data, such as a computer readable media (e.g., diskettes, tapes, compact disk, DVD, and the like) or a solid-state memory device. Storage device 204 may hold programs, instructions, and/or data for use with processing unit 102. In an embodiment, programs or instructions stored on or loaded from storage device 204 may be loaded into memory 206 and executed by processor 202. In an embodiment, storage device 204 holds programs or instructions for implementing an operating system on processing unit 102. Possible operating systems include, but are not limited to, UNIX, AIX, LINUX, Microsoft Windows, and the Apple MAC OS. The operating system executes on, and controls the operation of, processing unit 102. In an embodiment, the processing unit 102 provides the ability to share data via a network. One skilled in the art will recognize that storage 204 and memory 206 may be the same items and function in both capacities.

In an embodiment, input 210 may include a pointing device, such as a mouse, track ball, or touch pad, and may also include a keyboard or keypad to input data or instructions into processing unit 102. In an embodiment, processing unit may include one or more output device 208, which may include, but are not limited to, a display, LCD screen, CRT monitor, printer, touch screen, or other device for communicating information. In an embodiment, a display 108 (FIG. 1) may be output device 208, or alternatively, display 108 (FIG. 1) may be separate from output device 208. Processing unit 102 may also include a graphics adapter (not shown) to assist in displaying information or images on a display 108 and/or on output device 208.

Processing unit 102 may also include one or more network interfaces or adapters 212 to communicatively couple processing unit 102 to a network and/or to other devices. For example, network interface 212 may interface processing unit 102 to one or more imaging devices 101. The network adapter 212 may also interface processing unit 102 with other networks, devices, processing units, or computer systems.

In an embodiment, processing unit 102 may include a video capture module or card 214 for converting analog images into digital image frames. Video capture module 214 may be used for embodiments of the present invention in which imaging device 101 is an analog imaging device. Embodiments in which imaging device 101 is a digital imaging device may not require video capture module 214.

Figure 3:
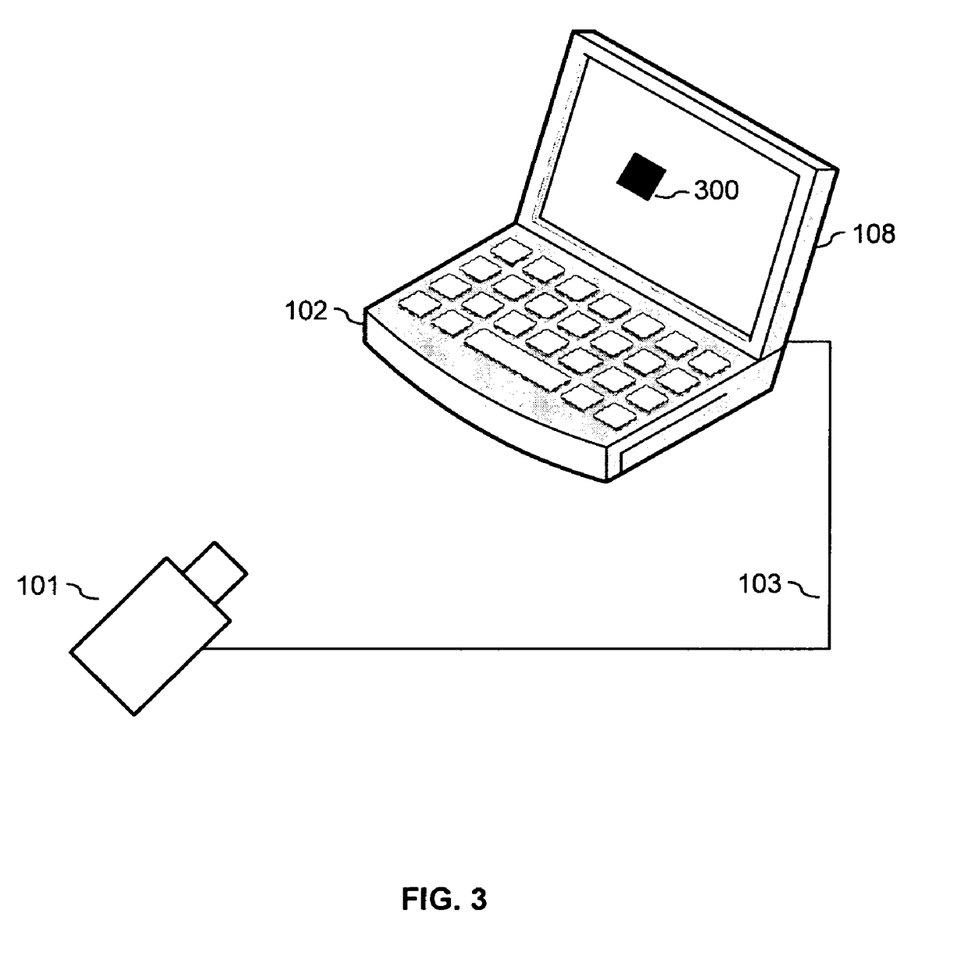
FIG. 3 depicts an imaging system, comprising an imaging device and a processing unit with an integrated display, according to an embodiment of the present invention.

One skilled in the art will recognize no processing unit is critical to the practice of the present invention. One skilled in the art will also recognize that a number of the elements described above may be physical and/or functionally separated into sub-modules or combined together. For example, FIG. 3 depicts an alternative embodiment in which processing unit 102 is a laptop computer with an integrated display 108. In an alternative embodiment, some or all of the elements of processing unit 102 may be incorporated into imaging device 101. In yet another embodiment, imaging device 101 and processing unit 102 (or portions thereof) may be combined in a device, including, without limitation, a PDA, mobile telephone, multimedia device, and the like.

Figure 4:
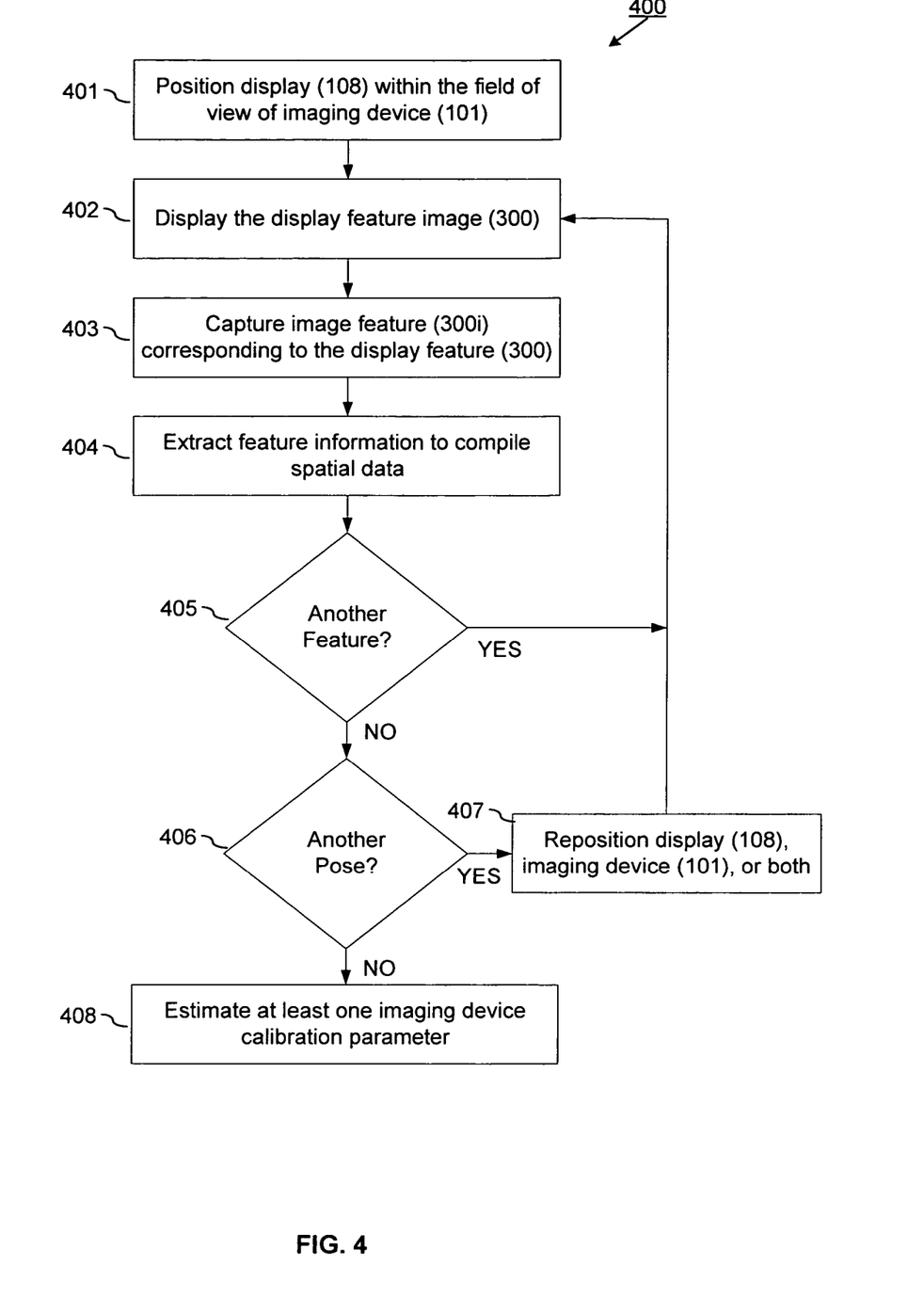
FIG. 4 depicts a method for calibrating an imaging device according to an embodiment of the present invention.

FIG. 4 depicts an embodiment 400 of a method for calibrating an imaging device. Display 108 is positioned (401) within the field of view of imaging device 101. In an embodiment, only one display feature 300 is presented (402) on display 108 at any time step. A benefit of displaying only one display feature at each interval step is that the process for capturing the image and extracting the spatial data is dramatically simplified and can also be done quickly. Displaying a single display feature, as opposed to displaying simultaneously a number of features, eliminates the possibility of confusing display features. Display feature 300 may be a simple geometric shape, such as a square, rectangle, circle, oval, cross, polygon, or the like. Alternative, display feature may be a more complex image or pattern.

With feature 300 displayed within the field of view of imaging device 101, an image feature may be registered or captured (403) within imaging device 101. The captured image feature correlates to the display feature displayed on display 108.

In an embodiment, to aid the capturing of the image feature when a display feature 300 is presented on display 108, feature 300 may be presented according to a temporal sequence or pattern that may be recognized by imaging device 101 or by processing unit 102. For example, in an embodiment, processing unit 102 may flash display feature 300 on display 108 according to a temporal pattern. Since processing unit 102 may be communicatively coupled to imaging device 101, processing unit 102 can register the imaging feature by matching the portion of the captured image that has the same temporal pattern. Such an embodiment is beneficial when configuring or calibrating the imaging system in an environment in which additional motion or background changes occur. For example, configuring or calibrating an imaging system in an area in which people or objects are moving in the background may make it difficult to identify the image feature in the captured image. By presenting the display feature according to a pattern or sequence, the corresponding image feature can be more readily identified.

Data may be extracted (404) to compile a set of spatial data related to both display feature 300 and its corresponding image feature. After compiling the spatial data related to displayed feature 300 and the captured image feature, another display feature may be displayed on display 108. If another feature is to be displayed, steps 402-404 are repeated in which the display feature is captured by imaging device 101 and additional spatial data is complied. This process may be repeated a specified number of times, in which a set of display features may be sequentially displayed. The number of display features in the set of display features may range from 1-n. In an embodiment, the locations of the display features presented on display 108 may vary. In an embodiment, the locations of the display features on display 108 may be randomly selected.

Having reached the completion of the set of display features, another pose may be selected (406). A pose may consist of repositioning (407) display 108, repositioning imaging device 101, or repositioning both. Repositioning shall be understood to include an adjustment to one or more of the following: tilt, rotation, and location. Imaging device 101, display 108, or both are repositioned, and the process returns to step 402, in which a set of display features are displayed, and the spatial data related to the display features and the corresponding image features is compiled. The number of poses may range from 1-m, depending upon the number of intrinsic imaging device parameters to be estimated. For example, in an embodiment, with a single view of a single plane, the aspect ratio and focal length may be calibrated, given the principal point, which represents the intersection of a principal or optical axis and the image plane. As a further example, in an embodiment, with two views of a single plane, or one view of two planes, the camera parameters may be fully calibrated. In yet another embodiment, three or more views may be used to calibrate the camera parameters.

In an embodiment, the same or different sets of display features may be displayed for the poses. In an embodiment, one or more of the system parameters of exemplary method 400, including the number of display features, the number of poses, the positions, and the like, may be predefined or may be provided by a user.

When all poses have been completed, the spatial data compiled throughout the process may be used to estimate (408) at least one imaging device calibration parameter.

Figure 5:
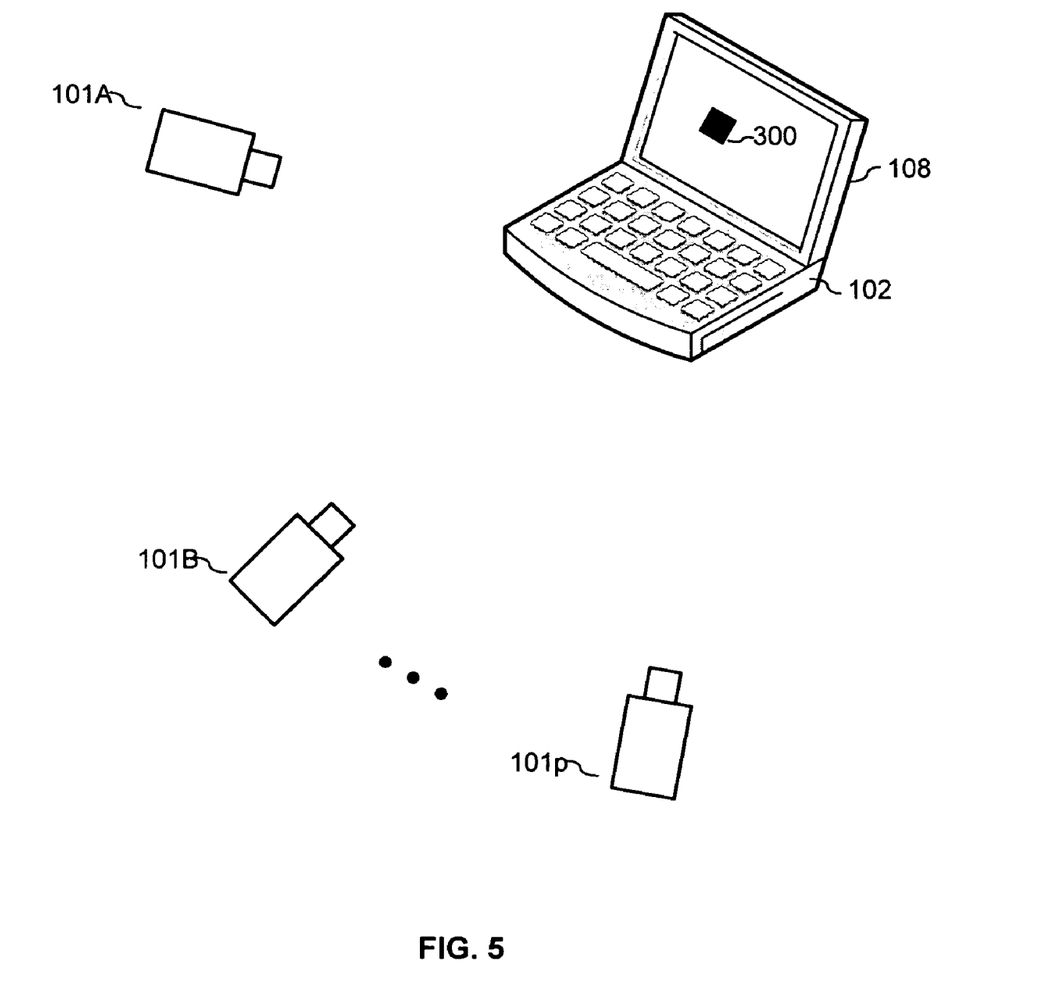
FIG. 5 depicts an imaging system, comprising an array of imaging devices and a processing unit with an integrated display, according to an embodiment of the present invention.

It should be noted that the present invention may be used for an imaging system with a single imaging device (as depicted in FIG. 3) or may be used for an imaging system with multiple imaging devices. FIG. 5 depicts an embodiment in which an array of imaging devices 101A-101p is part of imaging system 100. It should be noted that the number of imaging devices in the array may vary from 1-p, where p is any whole number. It should also be noted that there may not be a physical connection communicatively coupling an imaging device and processing unit 102. The present invention contemplates the use of wireless communications between one or more of the imaging devices and processing unit 102. The embodiment depicted in FIG. 5 is such a configuration. Each of the imaging devices selected for calibration has the display within its field of view during at least a portion of the calibration process.

Figure 6:
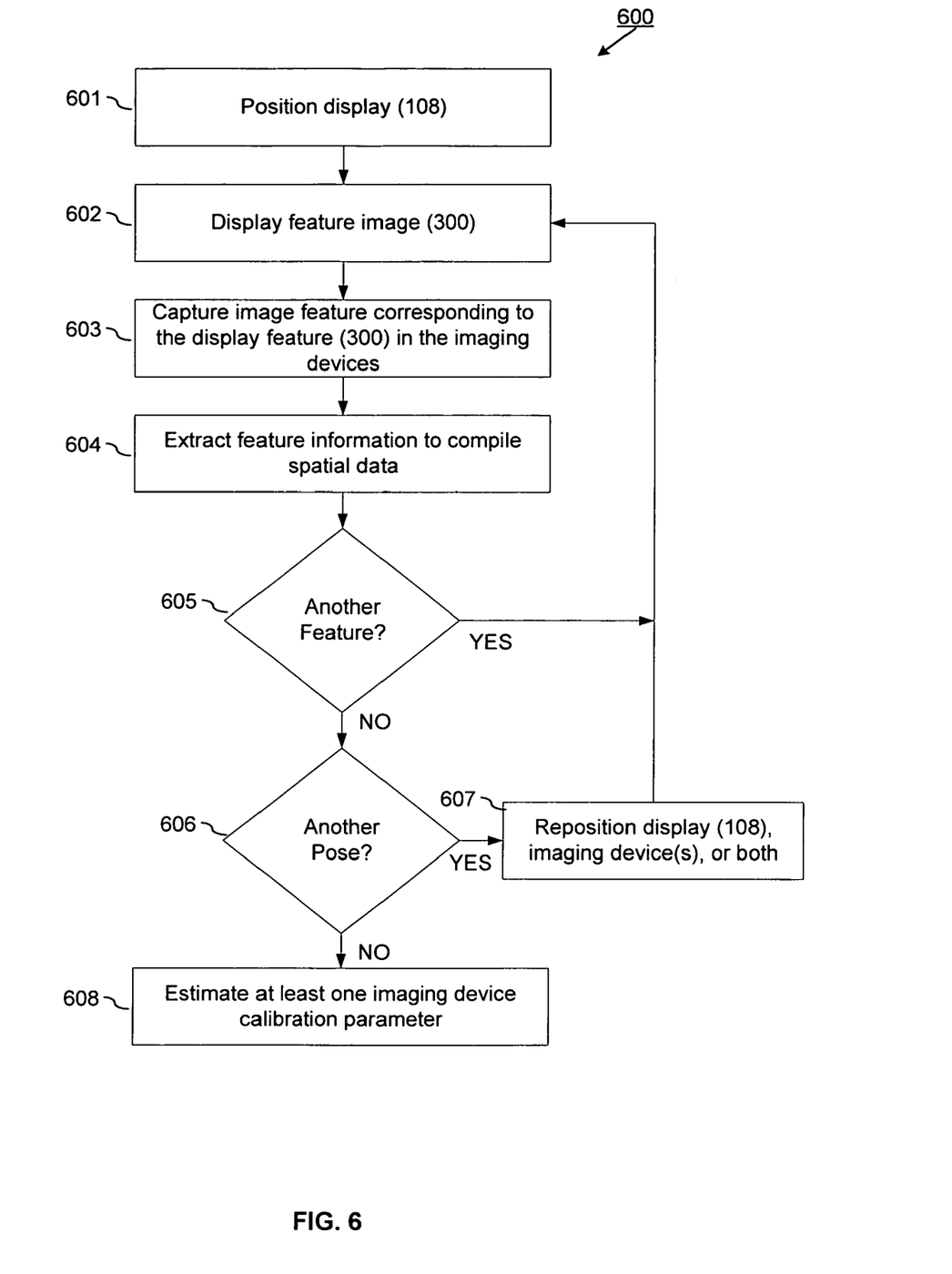
FIG. 6 depicts a method for calibrating an imaging system according to an embodiment of the present invention.

FIG. 6 depicts an embodiment 600 of a method for calibrating an array of imaging devices. The method begins by positioning (601) display 108. In one embodiment, display 108 may be positioned such that display 108 is within the field of view of each imaging device 101A-101p in the array of imaging devices. In some embodiments, display 108 may not be within the field of view of each imaging device 101A-101p in the array of imaging devices.

A display feature 300 (see FIG. 5) is presented (602) on display 108. In an embodiment, depending on the how much the fields of view of the imaging devices 101 overlap, display feature 300 may be adjusted in size so that it may be easily seen by the imaging devices.

With display feature 300 displayed, an image feature may be captured (603) within each of the imaging devices that have display 108 within its field of view. For each of these imaging devices, the captured image feature correlates to display feature 300 displayed on display 108. Information is extracted (604) to compile a set of spatial data related to both display feature 300 and its corresponding image feature in the imaging devices.

After compiling the spatial data related to displayed feature 300 and the captured image feature, another display feature may be displayed on display 108. If another feature is to be displayed (605), steps 602-604 are repeated in which the captured image is captured by the imaging devices and additional spatial data is complied. This process may be repeated a specified number of times in which a set of display features may be displayed. The number of display features in the set of display features may range from 1-n. As mentioned previously, in an embodiment, the locations of the display features presented on display 108 may vary, and they may vary randomly.

Having reached the completion of the set of displayed features, another pose may be selected (606). A pose may consist of repositioning (607) display 108, repositioning one or more of the imaging devices 101, or both. In an embodiment, display 108 may not be in the field of view of all of the imaging devices 101 for one or more poses. In an embodiment, as display 108 is moved through different poses, display 108 may fall within or may fall outside of the field of view of one or more of the imaging devices. In an alternative embodiment, each pose of display 108 maintains at least one imaging device 101 in common with another pose. For example, in an embodiment, each successive pose of display 108 maintains at least one imaging device 101 in common with a previous pose.

Following the repositioning, the process returns to step 602, in which a set of display features are displayed and the spatial data related to the display features and the corresponding image features is compiled. The number of poses may range from 1-m, depending upon the number of intrinsic imaging device parameters to be estimated. For example, in an embodiment, with a single view of a single plane, the aspect ratio and focal length may be calibrated, given the principal point, which represents the intersection of a principal or optical axis and the image plane. As a further example, in an embodiment, with two views of a single plane, or one view of two planes, the camera parameters may be fully calibrated. In yet another embodiment, three or more views may be used to calibrate the camera parameters.

In an embodiment, the same or different sets of display features may be displayed for the poses. In an alternative embodiment, one or more of the system parameters of exemplary method 600, including the size of the set of display features, the number of poses, the number of imaging devices, the positions, and the like, may be predefined or may be provided by a user. In an embodiment, each pose has at least one imaging device in common with another pose.

As noted in FIG. 6, the process is repeated a specified number of times, depending upon the specified number poses and upon the size of the sets of display features for each of the poses, to compile the spatial data. The compiled spatial data may be used to estimate (608) at least one imaging device calibration parameter. For any imaging device, a 3D world is projected to the image plane as 2D points. The spatial data may be denoted as a set of 3D features shown on the display and the projection of those 3D points on the imaging device or devices. For example, in a multiple imaging device configuration, the spatial data comprises a set of 3D points for all of the imaging devices to be calibrated and a set of 2D projected features on the image plane of each of these imaging devices.

Figure 7:
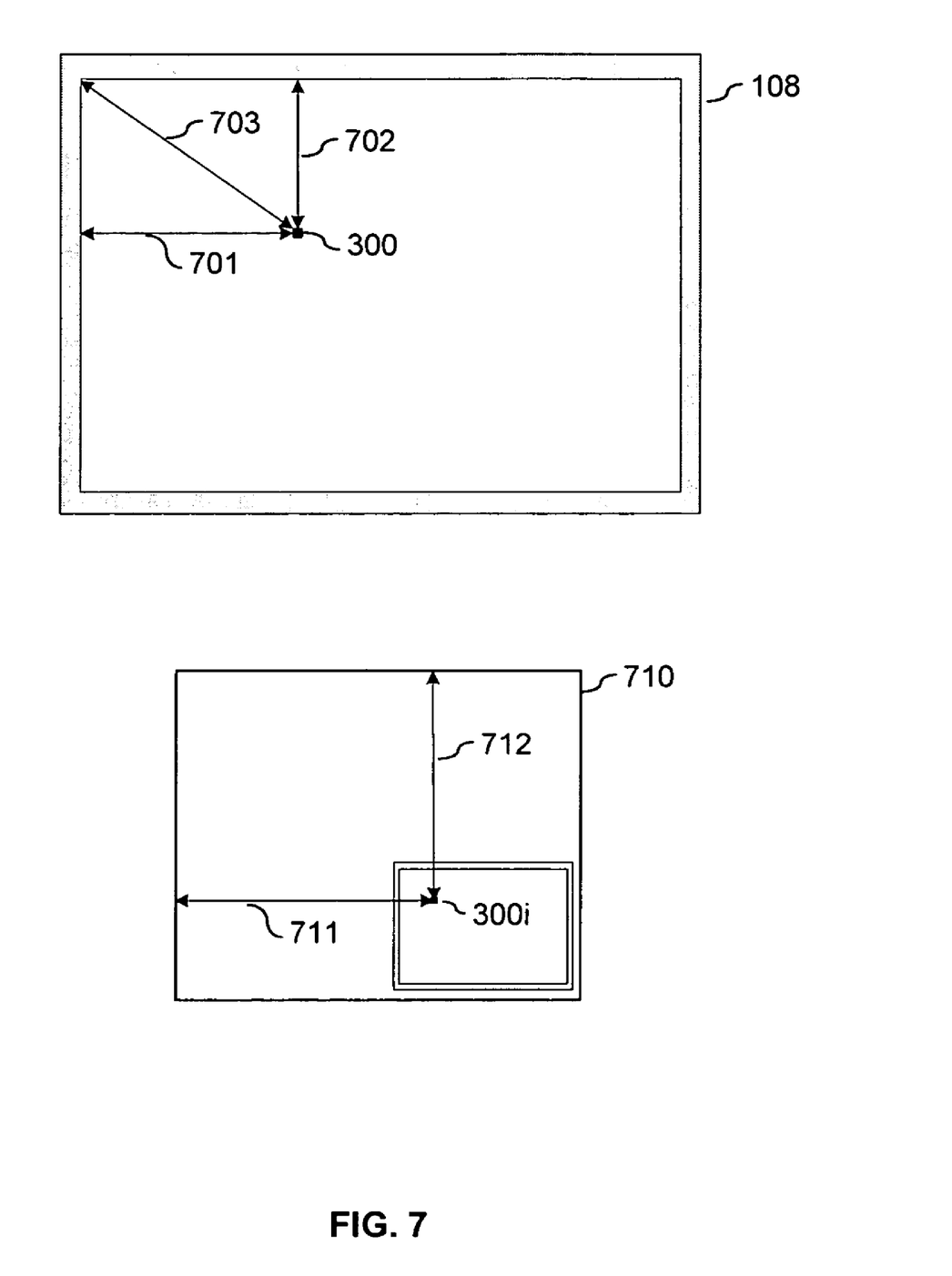
FIG. 7 depicts a display with a display feature and an image plane of an imaging device with an image feature corresponding to the display feature according to an embodiment of the present invention.

FIG. 7 helps illustrated the spatial data that may be collected according to an embodiment of the present invention. FIG. 7 depicts a display 108, which may be a separate display or an integrated display 102, with display feature 300. Also depicted is an image plane 710 of an imaging device 101 with an image feature 300i corresponding to display feature 300. In an embodiment, regardless of the number of imaging devices in the imaging system, the spatial data may comprise an array of two-dimensional feature data and an array of the corresponding three-dimensional data. The array of two-dimensional feature data may comprise the image feature's (300i) location 711, 712 in the image plane, and may also include the image feature's size. In an embodiment, the image feature's location may be measured to the center of the image feature 300i. In an embodiment, the image feature's (300i) location 711, 712 and/or size may be measured in pixels. The array of three-dimensional data may comprise the display feature's (300) location 701, 702, and may also include the display feature's size. In an embodiment, the display feature's (300) location 701, 702 may be measured to the center of the display feature 300. In an embodiment, the display feature's (300) location 701, 702 and/or size may be measured in millimeters or inches. The spatial data may also include the distance 703 from a corner of display 108 to display feature 300. One skilled in the art will recognize that distance 703 may be calculated from location data 701 and 702.

In an embodiment, two-dimensional feature data of the image feature may be obtained through simple threshold image capturing done by imaging device 101. In an alternative embodiment, further image processing techniques known in the art may be performed for precise feature location extraction and compilation. In an embodiment, by flashing features on the display, it is possible to eliminate unwanted similar patterns on the scene captured by imaging device. In an embodiment, more elaborate methods, including but not limited to, template matching or Hough transform may be used to extract exact location of a displayed feature projected in the image plane of an imaging device.

In an embodiment, three-dimensional data may be complied by obtaining or estimating or calculating the distance 703 of the display feature to the corner of display 108. The relative pixel location of display feature 300 on display 108 may be known from processing unit 102. Furthermore, the physical size and location of the display feature in pixels and in millimeters may be extracted from processing unit 102. Thus, it is possible to specify the three-dimensional coordinate of the display feature at runtime. Accordingly, for a pose and a time instant, spatial data may be collected representing the coordinates of the feature in the image plane and location data of the display feature in the real, three-dimensional world.

The compiled spatial data may be used to estimate (408/608) at least one imaging device calibration parameter. An estimate of one or more imaging device calibration parameter may be obtained using one or more optimization schemes known to those skilled in the art, including but not limited to the methods discussed in, Z. Zhang, "Flexible Camera Calibration by Viewing a Plane from Unknown Orientations," IEEE Seventh International Conference on Computer Vision (ICCV'99), available at http://www.vision.caltech.edu/bouguetj/calib_doc/papers/zhan99.pdf, and P. Sturm & S. Maybank, "On Plane-Based Camera Calibration: A General Algorithm, Singularities, Applications," IEEE Conference on Computer Vision and Pattern Recognition (CVPR'99), available at http://www.vision.caltech.edu/bouguetj/calib_doc/papers/sturm99.pdf, each of which is incorporated herein by reference in its entirety. Estimates may be obtained for an individual imaging device, for all imaging devices, or a combination thereof.

In an embodiment, pinhole geometry approximations and mathematics may be used to determine calibration parameters. It will be apparent to one skilled in the art that estimates of one or more imaging device parameters may be made using traditional camera calibration methods for single imaging device or multiple imaging device scenarios, including, but not limited to, those methods mentioned in: Z. Zhang, "Flexible Camera Calibration by Viewing a Plane from Unknown Orientations," IEEE Seventh International Conference on Computer Vision (ICCV'99), available at http://www.vision.caltech.edu/bouguetj/calib_doc/papers/zhan99.pdf; P. Sturm & S. Maybank, "On Plane-Based Camera Calibration: A General Algorithm, Singularities, Applications," IEEE Conference on Computer Vision and Pattern Recognition (CVPR'99), available at http://www.vision.caltech.edu/bouguetj/calib_doc/papers/sturm99.pdf, J. Heikkilä & O. Silvén, "A Four-step Camera Calibration Procedure with Implicit Image Correction," EEE Conference on Computer Vision and Pattern Recognition (CVPR'97), available at http://www.vision.caltech.edu/bouguetj/calib_doc/papers/heikkila97.pdf, T. A. Clarke & J. G. Fryer, "The Development of Camera Calibration Methods and Models," Photogrammetric Record, 16(91): 51-66, April 1998, available at http://www.optical-metrology-centre.com/Downloads/Papers/Photogrammetric%20Record%201998%20Camera%20calibration.pdf; and R. Y. Tsai, "A versatile camera calibration technique for high accuracy 3D machine vision metrology using off-the-shelf TV cameras and lenses," IEEE J. Robotics Automat., pages 323-344, Vol. RA-3, No. 4 (1987), each of which is incorporated herein by reference in its entirety.

By using a single display feature, calibration between the imaging devices may be calculated because it is known that the imaging device are all registering the same display feature. Thus, by using a common object, the display feature, the relative locations of the imaging devices with respect to each other may be determined.

The estimated or optimization calibration parameters may be intrinsic or extrinsic parameters. Intrinsic parameters may include focal length, radial distortion, scaling (aspect ratio), skew factor, and bias with respect to the image center or principal point. External parameters may include the relative position of an imaging device to display 108, the relative positions of the imaging devices 101A-101p in the array of imaging devices, and rotation.

In an embodiment, the calibrated imaging system may be configured with a depth key or level. Since depth is one of the parameter that may be determined, the imaging system or an imaging device 101 may be configured with a depth key. That is, only those images that represent objects at or within a specified distance or range of distances may be transmitted and/or recorded. For example, if an item of interest, whether a person or some object, is at a specified distance (which may include a range of distances), imaging system 100 may be configured not to transmit any captured images of objects that are outside of the specified distance. Such an embodiment may be beneficial for reducing the amount of image data that is transmitted or recorded, thereby reducing the recording size or bandwidth requirements. Depth keying or layering may be accomplished using one or more methods known to those skilled in the art, including but not limited to the methods discussed in, N. Komodakis and G. Tziritas, "Robust 3-D motion estimation and depth layering," International Conference on Digital Signal Processing, Santorini, 1997, available at http://www.csd.uch.gr/~tziritas/papers/3d-motion.pdf;

and N. Paragios and G. Tziritas, "Detection and location of moving objects using deterministic relaxation algorithms," IEEE International Conference on Pattern Recognition, Vol. I, pp. 201-205, Austria, 1996, each of which is incorporated herein by reference in its entirety. Depth layering allows for the representation of occluded regions and different spatial resolutions of objects with different depth ranges in different layers. Given a stereo imaging device pair with intrinsic and extrinsic camera parameters, one may practice depth layering of a scene captured by an imaging device. For any point in the scene, the depth may be determined and a layer or layers may be computed based on this depth key.

One skilled in the art will recognize that the present invention may be utilized in any number of devices, including but not limited to, web cameras, digital cameras, mobile phones with camera functions, personal data assistants (PDAs) with camera functions, and the like. It should be noted that the present invention may also be implemented in software, hardware, firmware, or any combination thereof. It should also be noted that processing unit 102 may be configured to perform one or more of the embodiments of the methods of the present invention.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

We claim:

1. A method for calibrating an imaging device comprising the steps of:
   positioning a display at a first pose within a field of view of the imaging device;
   displaying a set of single display features on the display, wherein each of the single display features from the set of single display features are displayed sequentially, the location on the display of each display features varies relative the rest of the display features in the set of display features, each display feature is selected from a group consisting of: a simple geometric shave; a complex image and a pattern, and each display feature consists of multiple pixels;
   capturing a set of image features in the imaging device corresponding to the set of single display features;
   compiling spatial data related to each of the single display features from the set of single display features and related to each of the corresponding image features from the set of image features; and
   estimating at least one imaging device parameter based upon the spatial data.

2. The method claim 1 wherein the set of single display features comprises more than one single display feature.

3. The method of claim 2 wherein the single display features from the set of single display features are displayed at random locations on the display.

4. The method claim 2 wherein at least one of the single display features is displayed according to a temporal pattern.

5. The method claim 1 further comprising the steps of:
   positioning the display at a second pose within a field of view of the imaging device, after the complete set of single display features has been displayed sequentially;
   displaying a second set of single display features on the display, wherein each of the single display features of the second set of single display features are displayed sequentially;
   capturing a second set of image features in the imaging device corresponding to the set of single display features; and
   compiling spatial data related to the second set of single display feature and the second set of image features.

6. The method claim 1 wherein the spatial data related to each of the single display features from the set of single display feature comprises an array of distance values representing the location of each of the single display features on the display and wherein the spatial data related to each of the corresponding image features comprises an array of two-dimensional data of the location in the image plane of each of the image features.

7. The method of claim 1 wherein the at least one imaging device parameter is selected from the group comprising: focal length, radial distortion, scaling (aspect ratio), skew factor, bias, relative position of an imaging device to the display, and rotation.

8. A computer readable medium containing a computer program to perform the method of claim 1.

9. A method for calibrating an imaging system comprising an array of imaging devices, the method comprising the steps of:
   positioning a display at a plurality of poses within a field of view of at least two imaging device from the array of imaging devices;
   at each pose:
     displaying a set of single display features on the display, wherein each of the single display features from the set of single display features are displayed sequentially, the location on the display of each display features varies relative the rest of the display features in the set of display features, each display feature is selected from a group consisting of: a simple geometric shape; a complex image and a pattern, and each display feature consist of multiple pixels;
     registering in each of the at least two imaging devices an imaging feature corresponding to the single display feature;
     compiling spatial data related to the single display feature and the corresponding image features; and
   estimating at least one parameter for the imaging system based upon the spatial data.

10. The method claim 9 wherein for at least one pose the steps of:
    displaying a single display feature on the display;
    registering in each of the at least two imaging devices an imaging feature corresponding to the single display feature;
    compiling spatial data related to the single display feature and the corresponding image features;
    are repeated.

11. The method of claim 10 wherein the single display feature is displayed at random location on the display.

12. The method of claim 10 wherein the single display feature is displayed according to a temporal pattern.

13. The method of claim 10 wherein the spatial data related the single display features and its corresponding image features comprises an array of distance values representing the location of the single display features on the display and an array of values for each of the corresponding image feature locations in the image plane.

14. The method of claim 9 wherein the step of estimating at least one parameter for the imaging system based upon the spatial data comprises estimating at least one parameter for each of the at least two imaging devices.

15. The method of claim 9 wherein the at least one imaging system parameter is selected from the group comprising: focal length, radial distortion, scaling (aspect ratio), skew factor, bias, relative position of an imaging device to the display, relative position between the at least two imaging devices, and rotation.

16. A computer readable medium containing a computer program to perform the method of claim 9.

17. An imaging system comprising:
   a processing unit;
   a display communicatively coupled to the processing unit; and
   at least one imaging device communicatively coupled to the processor unit;
   wherein the processing unit is adapted to perform the steps comprising:
      displaying a set of single display features on the display, wherein each of the single display features from the set of single display features are displayed sequentially the location on the display of each display features varies relative the rest of the display features in the set of display features, each display feature is selected from a group consisting of: a simple geometric shape; a complex image and a pattern, and each display feature consists of multiple pixels;
      registering in the at least one imaging device an imaging feature corresponding to the single display feature;
      compiling spatial data related to the single display feature and the corresponding image feature; and
      estimating at least one parameter for the imaging system based upon the spatial data.

18. The imaging system of claim 17 wherein the steps of:
   displaying a single display feature on the display;
   registering in the at least one imaging device an imaging feature corresponding to the single display feature; and
   compiling spatial data related to the single display feature and the corresponding image feature;
   are repeated.

19. The method of claim 17 wherein the at least one parameter for the imaging system is selected from the group comprising: focal length, radial distortion, scaling (aspect ratio), skew factor, bias, relative position of an imaging device to the display, relative position between imaging devices, and rotation.

20. The method of claim 17 wherein the single display feature is displayed according to a temporal pattern.

* * * * *

UNITED STATES PATENT AND TRADEMARK OFFICE
CERTIFICATE OF CORRECTION

| | | |
|---|---|---|
| PATENT NO. | : 7,554,575 B2 | Page 1 of 1 |
| APPLICATION NO. | : 11/260964 | |
| DATED | : June 30, 2009 | |
| INVENTOR(S) | : Ali Zandifar et al. | |

It is certified that error appears in the above-identified patent and that said Letters Patent is hereby corrected as shown below:

Column 9, line 42, change "shave;" to --shape;--

Column 10, line 25, change "device" to --devices--

Signed and Sealed this

Twenty-ninth Day of September, 2009

David J. Kappos
*Director of the United States Patent and Trademark Office*